(12) United States Patent
Winslow et al.

(10) Patent No.: US 11,423,370 B2
(45) Date of Patent: Aug. 23, 2022

(54) SYSTEMS AND METHODS FOR TRANSFERRING VALUE TO AND MANAGING USER SELECTED ACCOUNTS

(71) Applicant: Raise Marketplace, LLC, Chicago, IL (US)

(72) Inventors: Anthony Winslow, Brooklyn, NY (US); Michael Morris, New York, NY (US)

(73) Assignee: Raise Marketplace, LLC, Chicago, IL (US)

(*) Notice: Subject to any disclaimer, the term of this patent is extended or adjusted under 35 U.S.C. 154(b) by 1034 days.

(21) Appl. No.: 14/474,228

(22) Filed: Sep. 1, 2014

(65) Prior Publication Data

US 2015/0066748 A1 Mar. 5, 2015

Related U.S. Application Data

(60) Provisional application No. 61/959,873, filed on Sep. 4, 2013.

(51) Int. Cl.
| | | |
|---|---|---|
| *G06Q 20/10* | (2012.01) | |
| *G06Q 30/02* | (2012.01) | |
| *G06Q 20/36* | (2012.01) | |
| *G06Q 20/40* | (2012.01) | |

(52) U.S. Cl.
CPC ........... *G06Q 20/10* (2013.01); *G06Q 20/108* (2013.01); *G06Q 20/36* (2013.01); *G06Q 20/363* (2013.01); *G06Q 20/3676* (2013.01); *G06Q 30/0226* (2013.01); *G06Q 20/40145* (2013.01)

(58) Field of Classification Search
CPC .................................................... G06Q 20/10

USPC ............................................................ 705/39
See application file for complete search history.

(56) References Cited

U.S. PATENT DOCUMENTS

| | | | |
|---|---|---|---|
| 5,960,411 A | 9/1999 | Hartman et al. | |
| 6,378,905 B1* | 4/2002 | Neu ...................... | G06Q 99/00 705/30 |
| 7,398,236 B2* | 7/2008 | Jaffe ...................... | G06Q 20/10 705/35 |
| 8,332,313 B2 | 12/2012 | Doran et al. | |
| 8,332,329 B1* | 12/2012 | Thiele .................... | G06V 30/40 705/64 |
| 8,352,368 B2 | 1/2013 | Carlson et al. | |

(Continued)

OTHER PUBLICATIONS

Internet archeive for "Gift card Granny", Jun. 29, 2013 https://web.archive.org/web/20130629200356/https://www.giftcardgranny.com/gift-card-balance-check/ (Year: 2013).*

*Primary Examiner* — Mike Anderson
*Assistant Examiner* — Paul R Kloberg
(74) *Attorney, Agent, or Firm* — Garlick & Markison; Timothy W. Markison; Timothy D. Taylor

(57) ABSTRACT

Disclosed are the methods and systems for transferring value from a first account to a second account via a consumer device. The methods may be consumer or merchant driven and may involve transferring value to peers, oneself, or a third party account holder with or without the creation of a user account. Based on information input by a user, various financial systems interact in a manner that results in creation of an escrow account and effectuates transfer of value from a funding account through that escrow account to a receiving account. Such novel methods allow for previously unavailable transfers of value.

14 Claims, 10 Drawing Sheets

(56) References Cited

U.S. PATENT DOCUMENTS

| | | | |
|---|---|---|---|
| 8,639,621 B1* | 1/2014 | Ellis | G06Q 30/0267 |
| | | | 705/41 |
| 8,855,375 B2* | 10/2014 | Macciola | G06T 7/143 |
| | | | 358/448 |
| 9,171,296 B1* | 10/2015 | Kurian | G06Q 20/3274 |
| 9,311,531 B2* | 4/2016 | Amtrup | G06K 9/00523 |
| 9,436,942 B2* | 9/2016 | White | G06Q 30/02 |
| 2003/0220884 A1* | 11/2003 | Choi | G06Q 20/10 |
| | | | 705/64 |
| 2008/0109281 A1 | 5/2008 | Csoka et al. | |
| 2009/0070257 A1 | 3/2009 | Csoka et al. | |
| 2012/0140548 A1 | 6/2012 | Kono | |
| 2012/0234911 A1 | 9/2012 | Yankovich et al. | |
| 2012/0239563 A1 | 9/2012 | Csoka et al. | |
| 2012/0303526 A1 | 11/2012 | Csoka et al. | |
| 2012/0310824 A1* | 12/2012 | Liberty | G06Q 20/36 |
| | | | 705/40 |
| 2013/0013389 A1* | 1/2013 | Vitti | G06Q 30/0207 |
| | | | 705/14.35 |
| 2013/0132219 A1* | 5/2013 | Liberty | G06Q 20/202 |
| | | | 705/41 |
| 2013/0246261 A1* | 9/2013 | Purves | G06Q 20/36 |
| | | | 705/41 |
| 2013/0256403 A1* | 10/2013 | MacKinnon Keith | |
| | | | G06Q 20/20 |
| | | | 235/375 |
| 2014/0100991 A1* | 4/2014 | Lenahan | G06Q 30/0643 |
| | | | 705/26.7 |
| 2014/0136365 A1* | 5/2014 | Nista | G06Q 30/06 |
| | | | 705/26.1 |
| 2014/0258022 A1* | 9/2014 | Zamer | G06Q 30/0631 |
| | | | 705/26.7 |
| 2016/0055583 A1* | 2/2016 | Liberty | G06Q 20/405 |
| | | | 705/37 |

* cited by examiner

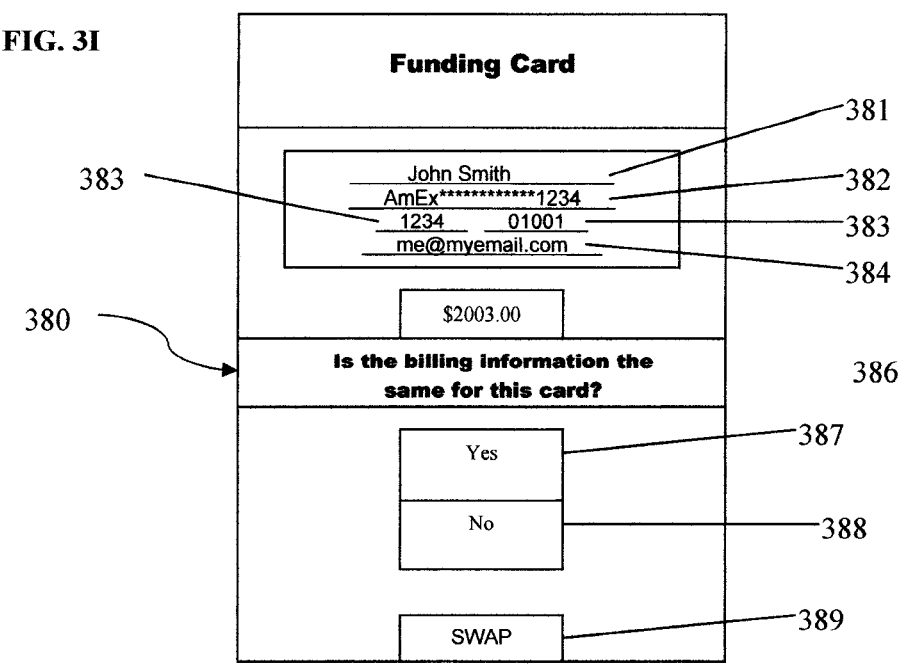

SYSTEMS AND METHODS FOR TRANSFERRING VALUE TO AND MANAGING USER SELECTED ACCOUNTS

CROSS REFERENCE TO RELATED APPLICATIONS

This application claims the benefit of U.S. provisional application no. 61/959,873 filed on Sep. 4, 2013 entitled "System and methods for transferring value to and managing user selected accounts". The entirety of that application is hereby incorporated by reference.

FIELD OF INVENTION

The present invention generally relates to computer systems and methods for transferring value from one account to another account. Specifically, the present invention relates to computer systems and methods for transferring stored value from checking or savings accounts, credit cards, debit cards, gift cards, network-branded, open-loop and general purpose prepaid cards, both re-loadable and non-loadable, to other accounts, including, but not limited to checking or savings accounts, debit or credit card accounts, PayPal, Amazon Payments, Venmo, online stored value accounts brokerage accounts or reloadable cards.

BACKGROUND OF THE INVENTION

Often, it would be desirable to transfer value from one or more accounts to another account. For example, the user may wish to transfer money from a gift card to a savings or checking account. In this way, the value of the funding card can be available in the account and may be spent as cash using a debit card, withdrawn as cash using an ATM card, or used to fund a personal check written against the account. In another example, the user may wish to transfer value from a credit card account to a bank account. A user also may wish to transfer money from a gift card or prepaid card to a credit card account, thus reducing the outstanding balance due on the account, or any outstanding balance (charge, revalue, lending on charge, late fees etc.) on the receiving end. A user may wish to transfer funds between more than two individuals; for example, User 1 and User 2 elect to transfer value simultaneously in an in-person context to User 3 in the form of one fluid action where the transfer amount is divided between the individuals to send funds, in this case User 1 and User 2. In another example, a user may wish to transfer value in the form of a loan. Systems and methods for facilitating such aforementioned transfers are highly desirable.

One existing method of making payments is PayPal. PayPal is directed primarily at Internet sales and purchasing. This service allows transfers using a credit or debit card, cash or check. However, transfers must be made to on-line accounts that the users have created through the PayPal system. Thus, it requires signing up for and verification of amounts using the PayPal system and transferring funds through the PayPal system prior to transfer to the desired account or availability to the user.

Accordingly, there remains a continuing need for a method that allows users to transfer value from one or more accounts to other user-selected accounts.

BRIEF DESCRIPTION OF THE DRAWINGS

The accompanying drawing figures incorporated in and forming a part of this specification illustrate several aspects of the invention and together with the description serve to explain the principles of the invention.

FIGS. 3A-3I illustrate exemplary screen shots for the swap service according to one embodiment of the invention.

SUMMARY OF THE INVENTION

Figure 1:
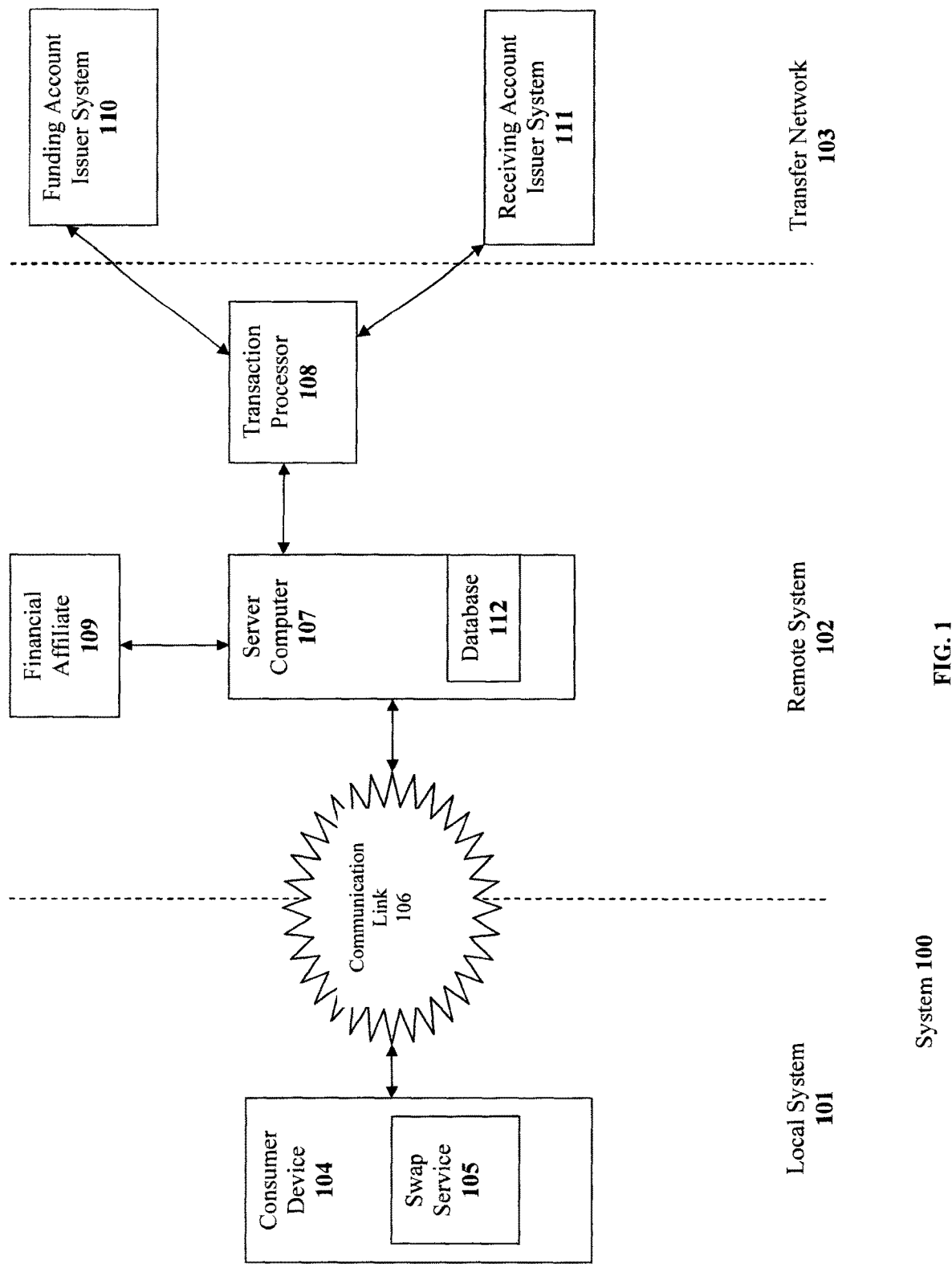
FIG. 1 illustrates a system for transferring value from a funding account to a receiving account according to one embodiment of the present invention.

The following presents a brief summary of the innovation in order to provide a basic understanding of the aspects of the innovation. This summary is not an extended overview and is not intended to cover each and every element of the innovation or to limit its scope. A more detailed description is presented later.

The innovation disclosed and claimed herein relates to methods, systems and computer readable storage media that allow transferring value from one account to another. The methods may be consumer or merchant driven and may involve transferring value to peers, oneself, or a third party account holder with or without the creation of a user account. For example, in one aspect, value is transferred from a first account to a second account using a consumer device by accessing a swap service through a consumer device that is communicatively linked to a remote system, said remote system communicatively linked to a transfer network, requesting funding transaction information including at least the identity of a funding account and a transaction amount from a user through a first user interface displayed by the consumer device, accepting the funding transaction information input through the first user interface, establishing an escrow account with a financial affiliate and issuing an escrow account identification code, submitting the funding transaction information and the escrow account identification and an authorization code to the funding account issuer system as a submission, receiving a submission payment in the amount of the transaction amount from the funding account issuer system into the escrow account, determining a transfer amount based on the funding transaction information, requesting receiving account information including at least the identity of the receiving account from a user through a second user interface, accepting the receiving account information input through the second user interface, providing transfer instructions including at least the receiving account information and the transfer amount and escrow account identification code to the receiving account issuer system causing a transfer of value to the receiving account.

In one aspect, the funding account may be a checking account, a savings account, a brokerage account, an open loop card account, a closed loop card account, a debit card, a prepaid card, a debit card account, a credit card account, a gift card, a cash card, a check card, a prepaid credit card, a stored value card, a payroll card, while the receiving account may be a bank account, a credit card account, a debit card account, a brokerage account, a debit card account, open loop card account, closed loop card account, a brokerage account, PayPal account, crypto currency account, or other stored value account. In another aspect, the funding account information or receiving account information, or both, is input by voice commands, extraction of information from a photo or video using optical character recognition or radio frequency identification (RFID), or a combination of the methods.

In another aspect, the transfer is completed through an automated clearing house (ACH), the funding account issuer's Billpay service, an intra-bank transfer, an automated teller machine (ATM) network, a crypto-currency service, or through another stored value network or service. In other aspects, the transfer may be completed through the conversion of the net transfer amount into loyalty points in a third party system based on a conversion factor associated with a difference in net transfer amount and an assigned second value of said loyalty points, and creating, by said remote system, said net transfer amount to said third party; through a virtual wallet established by radio frequency identification (RFID); through near field communication (NFC), through Bluetooth low energy (BLE), through a wireless network, through a personal area network (PAN), or other computer network. In one aspect, the user is identified using biometric information.

In one aspect, the innovation allows transfer of value for servicing a loan agreement by inputting loan terms including at least a loan amount, an interest rate, a payment schedule and a late fee schedule through a user interface displayed by the consumer device. In another aspect, the method also includes inputting user data points through a user interface displayed by a consumer device, submitting said data points to a third party service to validate the user's identity, submitting said data points to potential lenders to determine an approved loan amount, and presenting the user with an approved loan amount, any fees that are associated with the loan, and instructions for the application of fees and interest upon the expiration of the loan term.

In another aspect, the innovation allows for retrieving balances on prepaid cards by accessing a swap service through a consumer device, inputting prepaid card identifying information through a user interface displayed on the consumer device, transmitting the prepaid card information to an aggregator service for balance validation, receiving validation of card information, transmitting a request for balance information to the aggregator service, receiving balance information from the aggregator service and displaying balance information and transaction history to the user through the user interface. All of the above aspects may be implemented through computer executable instructions found on a computer readable storage media.

Particular illustrations are described in connection with the following descriptions and the annexed drawings. These illustrations are indicative, however, of but a few of the various ways in which the principles of the innovation can be employed. Other advantages will be readily apparent from the detailed description that follows. The subject innovation is intended to include all aspects and equivalents.

DETAILED DESCRIPTION OF THE INVENTION

The present invention can be better understood from the following description of preferred embodiments, taken in conjunction with the accompanying drawings. It should be apparent to those skilled in the art that the described embodiments of the present invention provided herein are merely exemplary and illustrative and not limiting.

The present invention is directed to a novel and non-obvious systems and methods for transferring value from a funding account to a user-selected account. The user-selected account also may be referred to as a receiving account. Value will most commonly be monetary value. However, value may be anything of monetary worth that may be exchanged for goods or services.

Funding accounts may take various forms in different embodiments of the invention. In one embodiment, the funding account is a checking account, savings account, brokerage account or the like. In another embodiment, it may be a card account. Examples of such card accounts include, but are not limited to, debit card accounts, credit card accounts, open-loop prepaid (OLP) cards or any card that stores value and allows a user to exchange the value stored on the card for products, goods, services or the like. A card may be a gift card, cash card, check card, prepaid credit card, stored value card, payroll card, or the like. A card may be prepaid or non-prepaid. A card may also be reloadable or non-reloadable. Receiving accounts may take various forms in different embodiments of the present invention. Such receiving accounts may include any account to which value can be transferred. Such receiving accounts include at least bank accounts, credit card accounts, brokerage accounts, PayPal accounts, a debit card account, open loop card account, closed loop card account, a brokerage account, PayPal account, crypto currency account, or other stored value account, or the like.

In accordance with the present invention, transfers are facilitated through a swap service. The swap service facilitates the transfer of funds from one or more accounts to one or more other accounts. The swap service provides instructions to a consumer device and collects transfer information and provides the transfer information and transfer instructions to the consumer device. The consumer device communicates the transfer information and transfer instructions to a remote system that authorizes, settles and funds the transfer by communicating with appropriate financial networks. After the transactions are authorized, the swap service acts as a merchant, charging the funding account for the requested amount. The requested transfer is then completed through an automated clearing house (ACH), a funding account issuer's Billpay service, intra-bank transfer, automated teller machine (ATM) network, crypto-currency service, or other stored value network or service. In other embodiments, the transfer may be completed through a virtual wallet established by radio frequency identification (RFID), near field communication (NFC), Bluetooth low energy (BLE), wireless network, personal area network (PAN), or other computer network.

Using the swap service, two users can easily negotiate and execute a loan agreement and fund transfers in accordance with the loan terms. In such an embodiment, User 1, the lender, and User 2, the borrower, negotiate the terms of a loan. Such terms may include the loan amount, the number of days until the loan matures and is due, an interest rate and a late fee schedule. User 1 and User 2 would provide funding account information and receiving account information in the swap service and initiate the transfer. Based on the user inputted information, the swap service facilitates withdrawal of funds equal to the loan principal from the funding/lending account and places the funds in a bank escrow account. When the loan payment is due, the receiving/borrowing account is automatically debited for the loan principal plus interest and any agreed upon fees. The funds then are transferred from the escrow account to the receiving/borrowing account. If the transfer fails the receiving account will be debited again plus a fee equal to the fee schedule.

The swap service also may facilitate payday and instantaneous loans using an instant application process. The user provides data points such as credit card information, bank account information, employment and paystub information, and other personal information through the swap service interface. Based on this user-provided information, the swap service contacts third party services such as a social network and validates the user's identity. Upon a successful application process, the swap service presents the user with an approved loan amount, the fees that are associated with the loan, and instructions for the application of fees and interest upon the expiration of the loan term. Upon the user's acceptance of the loan amount, associated fees and instructions, the swap service facilitates transfer of the loan amount into a user selected account. In most cases, the user would be able to use the transferred funds instantly but some cases may require further data validation based on applicable credit rating policies. After the loan term expires, the swap service will, per the instructions, facilitate automatic transfer of the loan amount and any applicable fees and interest from the borrower's account to an enterprise merchant account. Prior to the transfer, the swap service may cause an automated servicing e-mail to be sent to the borrower in advance, reminding the borrower that the repayment will take place at the agreed upon time and date.

The swap service also may facilitate lower-than-market cost cross-market exchanges between users in international markets using currency reserves. For example, when User 1, based in the United Kingdom, transfers value in British pounds to User 2, based in the United States, which results in a converted credit of United States dollars, the swap service will recognize, based on the home country in which each user has a linked financial institution account, that a cross-market transfer is being facilitated. The swap service will access current exchange rates and disclose the exchange rate and applicable fees to each user. User 1 can acknowledge the disclosure and accept the rate and applicable fees. The exchange rate also may be manually modified if needed or desired and the swap service will display the difference between the actual market exchange rate and the modified exchange rate. Upon acceptance of fees and terms, the swap service facilitates transfer of the funds from User 1's funding account to a merchant account based in that same country, facilitates transfer of the converted amount to a merchant bank in User 2's country, and facilitates transfer of the value to User 2's account. The funds become available for use to User 2 upon successful transfer.

The swap service also may function as a payments front-end and account management tool with a supporting third party bank. In such an embodiment, the swap service would have access to user bank accounts and may be used to transfer funds in and out of their account, access BillPay, use ATMs (after receiving an associated card) as well as utilize the core swap services (prepaid transfer, credit card transfer, currency transfer, payday loans, peer to peer loans). Users would be able to order (via mail) or pick up in-store their own card but also may receive inactive, unassigned cards or be given an electronic payment instrument. The inactive, unassigned cards may be activated in real-time using a phone or computer and handed over to another user. The account may be set up as a sub-account of the primary swap service account holder (User 1), and may be given to a sub-account holder (User 2). The account may also be set up as a new account that is separate from the User 1's account. User 2's activity may be visible or invisible to the primary account holder (depending on the desired configuration) and User 2 could access and manage their sub-account through the same swap service interface, personalized for User 2. User 1 and User 2 may also transfer funds back-and-forth between their accounts. At any juncture, the primary account holder can electronically (by electronic transfer of stored value on the card to another individual) or manually (by handing over the card to a new user) designate another user or individual as the new primary account holder, allowing the value of these cards to transfer fluidly at the discretion of the individual who owns the card and associated stored value at any given time.

The swap service also may offer an application and web browser experience that allows users to send a financial gift electronically to another individual of their choice. In this case, User A (sender) select the denomination they wish to gift to another user, User B (receiver). User A will fill out personal information fields for KYC validation and select a funding source (open loop prepaid card, credit card, debit card, PayPal, bank account). Then, User A populates basic information fields allowing the swap service to identify User B, including their first name, last name, and e-mail address. After User A completes the sending action by finalizing the sending amount, User A's funding account is authorized and charged, and funds transfer from the sender's account into a special purpose account run by the swap service, awaiting claim from User B. Next, User B accesses their swap service financial gift via the electronic link provided in an e-mail notification sent by the swap service. User B will fill out personal information fields for KYC validation and select an account in which to receive funds (e.g., credit card or bank account). After final confirmation of User B's desire to receive the funds, the funds residing in the special purpose account transfer to User B's designated receiving account. User A receives a trigger electronic notification that the gift has been officially redeemed by User B.

The swap service also may provide the user with balance information for the user's prepaid cards. The swap service stores uniform resource locators (URLs) for checking balances for prepaid cards from certain issuers (such as Vanilla or American Express). The swap service then uses user inputted data (credit card number, expiration, card identification (CID) number) to crawl card issuer web pages and retrieves balance information based on the user inputted information. The swap service also may use the user submitted and retrieved information to auto populate fields within the swap service and display card balance when the user is entering a transfer amount within the swap service.

The consumer device may take several forms and may be any device that is capable of communicating information to the remote system. In one embodiment the consumer device is a mobile device such as a phone, personal digital assistant (PDA), tablet, or the like. In another embodiment, the consumer device is a personal computer such as a laptop computer or desktop computer. In another embodiment the consumer device is an Apple iPhone or phone running the Android operating system. In various embodiments, the swap service may be an application or program installed on the consumer device. In other embodiments, the swap service may be a remotely stored application or program that displays on the consumer device. In another embodiment, the swap service is accessed through the web browser of the consumer device.

In various embodiments, the remote system may include a server computer and a transaction processor. Some or all of these may be part of third party systems. For example, BancBox and VisaNet offer third party systems that communicate with financial networks and systems and financial affiliates for processing, settling and funding the transactions provided herein according to instructions provided by the swap service via the consumer device. Application program interfaces (APIs), software development kits and code for communicating with such third party systems are available and known in the art for a variety of computer languages.

In some embodiments of the invention, a user can be identified using biometric information. Such biometric information may include, for example, fingerprints, handprints, voice recognition, facial recognition, iris or retina scans, or any other factor that is personally unique. The biometric information may be used to authenticate the user of the swap service. In addition, the biometric information may be linked to a unique user identification code that is linked to the user's information. This will add an additional layer of security to the swap service. Systems and methods for biometric recognition are known in the art. Examples of such methods and systems can be found, for example, in U.S. Pat. No. 8,260,008, U.S. Pat. No. 8,275,175, U.S. Patent App. No. 2013/0129162, EP 0976087 and the references cited therein, the disclosures of which are hereby incorporated herein by reference in their entirety. Software development kits (SDKs) for integrating biometric identification recognition systems into the local systems of the present invention are available in the art.

In some embodiments, instructions for carrying out the various steps of the transfer process may be in the form of computer-executable instructions stored on a computer readable medium. The consumer device may contain a computer readable medium that contains instructions to direct the consumer device to perform the methods of the present invention. For example, the computer readable medium may contain computer code that instructs the consumer device to launch the swap service from the memory of the consumer device. In addition, the computer readable medium may include instructions for the consumer device to prompt the user to provide transfer information, instruction for the consumer device to provide a scanner for inputting card information, or instructions for the consumer device to submit information to the remote system.

In some embodiments, the computer-executable instructions are stored on a computer readable medium installed on the local system such as the internal storage, microprocessor or SD card found in a mobile device such as a cellular phone, personal digital assistant (PDA), tablet or the like. The computer-executable instructions also may be stored on other computer readable medium such as a universal serial bus (USB) drive, SD card or CD-ROM. In other embodiments, computer-executable instructions are stored on a server computer system and accessed via a communications link or a computer network, such as an intranet, the Internet, or another computer network.

Certain specific details are set forth in the following description and in FIGS. 1-5 to provide a thorough understanding of various embodiments of the invention. Because the basic structures and functions related to computer-readable routines and corresponding implementations are known, including linking to remote systems to provide information and instruction regarding authorization, funding and settlement of financial transactions, they have not been shown or described in detail here in order to avoid unnecessarily obscuring the described embodiments. In addition, some well-known structures and systems often associated with computer networks have not been shown or described in detail below to avoid unnecessarily obscuring the description of the various embodiments of the invention. In addition, although not described in each instance, typically, all of the communications and transfers between the components in any of the systems or networks depicted herein are encrypted. Those of ordinary skill in the relevant art will understand, however, that the invention may have additional embodiments which may be practiced without several of the details described below. In other instances, those of ordinary skill in the relevant art will appreciate that the methods and systems described can include additional details without departing from the spirit or scope of the disclosed embodiments.

FIG. 1 depicts one embodiment of the value transfer system 100. In the embodiment shown in FIG. 1, the system 100 comprises a local system 101, a remote system 102 and a transfer network 103. The local system 101 includes a consumer device 104 and a swap service 105. The consumer device 104 is communicatively linked to the swap service 105. In one embodiment, the swap service 105 is installed locally on the consumer device 104 as a program or application. In another embodiment, the consumer device 104 includes a microprocessor and a computer readable media on which the code for the swap service 105 is installed. In another embodiment, the swap service 105 may be accessed by the consumer device 104 through a cellular network, a wired or wireless network, via the internet, through a web client or interface, as software as a service (SaaS) or through local or wide area networks.

The transfer process begins with a user calling up the swap service 105 on the consumer device 104. The swap service 105 requests the user to input the transfer request amount and to identify the funding account. The user may input the information manually. This may be done using the consumer device keyboard or a keyboard associated with the swap service 105. In some embodiments, the information may be input through voice commands. In another embodiment, the consumer device 104 includes an optical device that may receive a picture or video of the funding card. In still other embodiments, the information is input through radio frequency identification (RFID). The information will be stored on servers for possible later retrieval in the event the user wishes to create an account. The consumer device 104 may then process the image and extract the funding card information using optical character recognition (OCR). Such information may include the user's name, funding account number, expiration date, unique card identification number and the like. Software development kits (SDKs) that allow scanning of cards to retrieve the card information are known in the art. One such SDK is available from card.io. In one embodiment, the user system 101 may request the user to enter additional user contact information such as the user's name, email, financial information, employment information, paystub information and the like. The consumer device 104 stores the user-inputted information.

The local system 101 is communicatively linked to the remote system 102 through a communications link 105. The remote system 102 may include data processing subsystems, networks, and operations used to support and deliver authorization services, exception file services, and clearing and settlement services. In the embodiment depicted, the remote system comprises a server computer 107 and a transaction processor 108. The server computer 107 may additionally include a database 112 for storing data. In certain embodiments, remote system 102 may be part of a third party system.

Exemplary third party systems are those offered by BancBox and VisaNet. The communications link 106 may be a cellular network, an intranet, a wired or wireless network, the internet, a local or wide area network.

The remote system 102 is communicatively linked to a transfer network 103. Typically, a transfer network 103 will include, but is not limited to, a financial affiliate system 109, a funding account issuer system 110 or a receiving account issuer system 111. The financial affiliate system 109, funding account issuer system 110 and the receiving account issuer system 111 may be part of any of the networks that a funding account or a receiving account uses to provide authorizations, settle or clear financial transactions or transfers. Examples of such networks include VISA, NOVA and Automated Clearing House (ACH).

The data exchanges between the consumer device 104 and the server computer 107 are dependent on user-selected functions available through and provided by the swap service 105. Based on the user submitted information, the consumer device 104 provides instructions to server computer 107 to request authorization of the requested transaction from the appropriate funding account issuer system 110.

In some embodiments of the invention, a service provider fee will be charged to one of the users. In such instances, the swap service 105 will determine a net transfer amount (the requested transfer amount less the service provider fee) which may include a monthly subscription fee for a preset number of transfers, and a service provider fee amount. In such instances, the swap service 105 may provide a message informing the user of the fee and requesting acceptance of such fee. In some embodiments of the invention, interest rates and late fees may be charged. The server computer 107 stores the card information, a user identification and password, requested transfer amount and any service provider fee or user-designated fee and sends the information to the transaction processor 108. The transaction processor 108 routes the request to the correct funding account issuer system 108 according to information provided by the server computer 107. In some embodiments of the invention, a currency reserve will be utilized to facilitate cross-market exchanges.

Typically, all communications and/or data exchanges described herein are encrypted to preserve privacy and ensure the security of the information, data and user accounts and at each step of the process the receiving system or component will unencrypt the information it receives and encrypt the information it sends. For clarity and to not obscure the description, the steps of unencrypting and encrypting data and information have been omitted from the description of the transfers.

If the funding account issuer system 110 authorizes the transaction, the funding account issuer system 110 will provide an authorization code to the transaction processor 108. In some embodiments, the timing of transfers can be increased by using reserve funds held by the swap service in a merchant-owned electronic account, where the service uses certain data points provided by users, to create a risk profile of the user. In some embodiments, a success message also may be provided to the user through the swap service 105. The transaction processor 108 provides the message and authorization code to the server computer 107. The server computer 107 stores the authorization code and communicates with the consumer device 104, which communicates with the user through the swap service 105. In some embodiments, a message will be returned to the swap service 105 informing the user if the transfer request was accepted or denied. In other embodiments, an email or text message may be returned to the user.

Upon receipt of the transfer authorization, the swap service 105 will request receiving account information from the user. The user may input the receiving account information manually or by scanning a receiving account card. In some embodiments, the swap service 105 may request additional contact information including, without limitation name, email and billing zip code. The user submitted information is stored in the consumer device 104 and the swap service 105 instructs the consumer device 104 to submit the information with instructions to the server computer 107 to begin the settlement and funding process. The server computer 107 receives and stores the receiving account information and transfer amount. The server computer 107 sends the receiving account information and processor keys to the transaction processor 108 and the transaction processor 108 routes the request to the correct receiving account issuer system 111. If the receiving account issuer system 111 authorizes the transaction a success message and an authorization code is returned to the transaction processor 108.

The transaction processor 108 sends the authorization message and authorization code to the server computer 107. The server computer 107 stores the authorization code with the receiving account information and transfer amount. In some embodiments, the server computer 107 triggers an email to the user. The consumer device 104 receives successful authorization message from the server computer 107 which may be displayed on the swap service 105.

The server computer 107 retrieves the funding account information and sends the funding account information, the transaction amount and the authorization code to the transaction processor 108 as a submission. The transaction processor 108 receives the funding card information, transaction amount and authorization code and sends it to the funding account issuer system 110 as a submission. The funding account issuer system 110 receives the funding account information and the transaction amount and processes the submission. The funding account issuer sends the submission payment in the amount of the transaction request back to the transaction processor 108 with the funding account information. The transaction processor 108 sends the submission payment to the server computer 107 with the funding account information.

The server computer 107 retrieves the receiving account information plus the net transfer amount, together with the amount of any service provider fees or user-designated fees, from the server computer database 112. The server computer 107 assigns a temporary escrow account identification code to the receiving account information and the transaction amount, allocates the service provider fee, if any, to a service provider identification code, stores the temporary escrow account identification code, the receiving account information and the net transfer amount. The server computer 107 sends the receiving account information, net transfer amount, temporary escrow account identification code and the service provider identification code and the service provider fees to the financial affiliate 109. The financial affiliate 109 deposits the net transfer amount in a temporary escrow account and deposits the service provider fees in the service provider account using the service provider identification code. The financial affiliate 109 sends the temporary escrow account identification code and the net transfer amount to the server computer 107. The server computer 107 retrieves the receiving account information and the net transfer amount from the server computer database 112. The server computer 107 transfers the information to the transaction processor 108 with BillPay instructions. The transaction processor 108 sends the receiving account information and the net transfer amount and to correct receiving account issuer system 111 with a BillPay ISO code. The receiving account issuer system 111 processes payment to the receiving account based on the BillPay ISO code. The receiving account issuer system 111 returns the receiving account information and a success response code to the transaction processor 108. The transaction processor 108 sends the receiving account information and the success response code to the server computer 107 which server computer 107 records said receiving account information and success response code in the server computer database 112. The server computer 107 may send a trigger email to the user that the transfer has cleared.

Figure 2A:
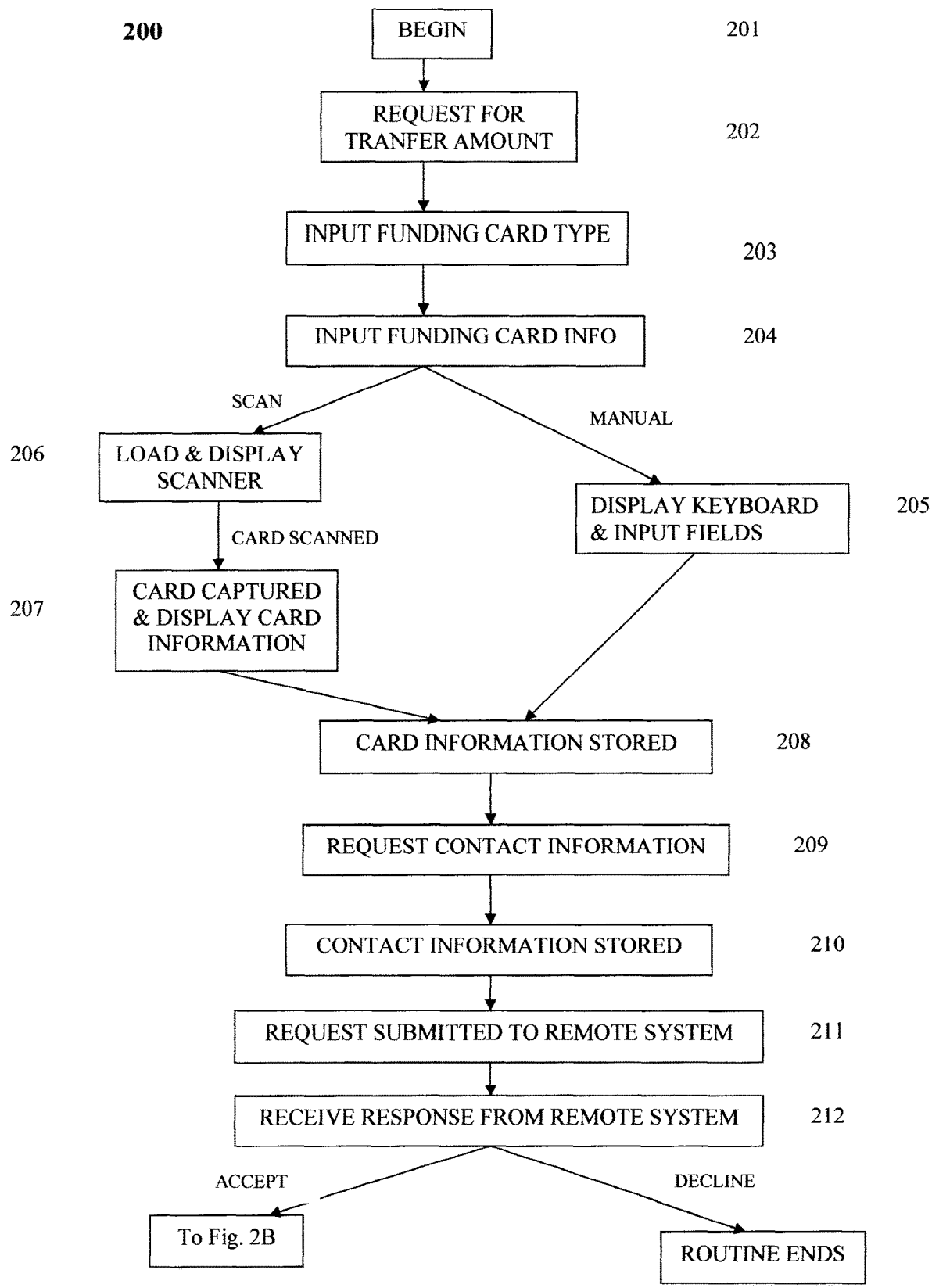
FIG. 2A is a flow diagram of a routine for inputting and submitting a transfer request according to one embodiment of the present invention.

FIG. 2A is a flow diagram depicting a routine 200 that operates the swap service 105 through authorization of the funding request. The method may begin at step 201 where the user starts program by accessing the swap service 105 from the consumer device 104. This may be accomplished by clicking on the program saved locally in the consumer device 104 or by accessing the swap service 105 through a web browser. At 202, the swap service 105 displays a request for a funding transaction amount. After the user enters the transaction amount, the swap service 105 requests identification of the type of funding account at 203. In some embodiments, the swap service 105 may also request acceptance of service provider fees or user-designated fees associated with the transfer. Service provider fees may be a flat fee or a percentage of the transfer amount. User-designated fees may be late fees or interest rates. In embodiments where a service provider fee is charged, the swap service 105 may display a message disclosing the service provider fee amount and request that the user confirm and accept the service provider fee. At 204 the swap service 105 requests input of the funding card information. In some embodiments, the funding card information may be input manually, including the manual input of a credit card's CID number. In other embodiments, the funding card information is scanned. If manual input is selected, the swap service 105 may display a keyboard and input fields at 205. If scan input is selected, the scanner is displayed at 206. The scanner captures the card and displays the card information to the user at 207. The swap service 105 stores the card information at 208. At 209, the swap service 105 requests the user's contact information and displays a keyboard and submit button. The contact information may include the user's name, billing zip code and email. When complete, the user taps the submit button. In some embodiments this information may be stored in the swap service cache. At 210, the card information is sent to the swap service cache in the consumer device 104. At 211, the swap service encrypts the card information and sends the card information to the remote system 102 with the transfer amount less any service provider fee (net transfer amount) with instructions for obtaining authorization. The user request is then routed to the funding account issuer system 110 for authorization. At 212, the swap service 105 receives a message from the remote system 102 accepting the transfer request or declining the transfer request. If the transfer request is declined, the routine ends. If the transfer request is authorized, the swap service 105 runs the routine depicted in FIG. 2B.

Figure 2B:
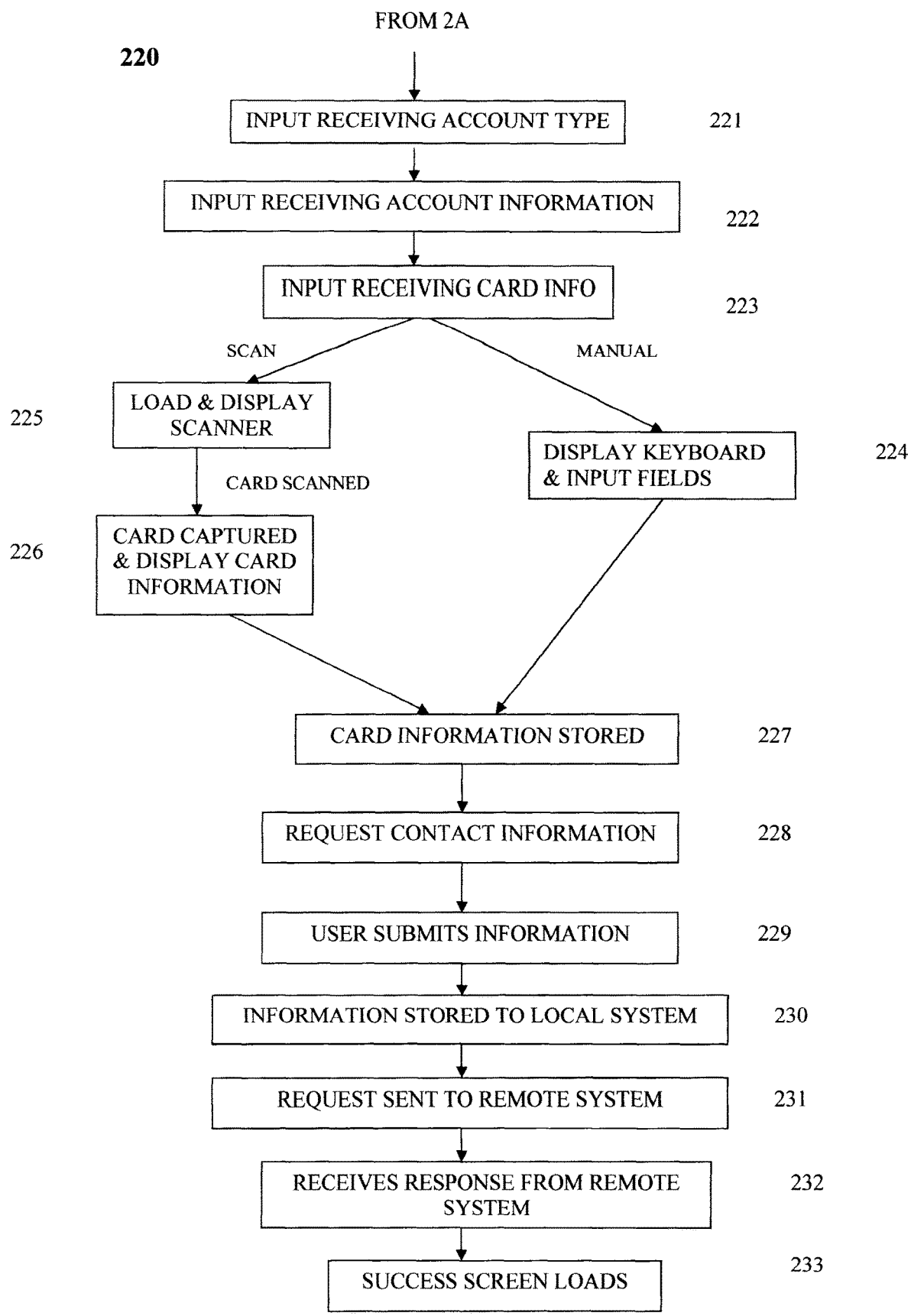
FIG. 2B is a flow diagram of a routine for submitting and completing a user requested transfer of value according to one embodiment of the invention.

FIG. 2B is a flow diagram depicting a routine 220 that operates the swap service 105 to complete funding of the transfer request once authorization of the transfer is obtained. If an authorization message is received, the swap service 105 displays a request to identify the receiving account type at 221. At 222, the swap service 105 displays a request for the receiving account information. At 223, the swap service 105 will provide the user with the option of inputting the card information manually or scanning the card information. If manual input is selected, a keyboard and input fields are provided at 224. If scan input is selected, the swap service loads the scanner at 225. At 226, the card is captured and card information is displayed. At 227 the card information is stored. At 228, the swap service 105 requests the user's contact information and displays a submit button. The contact information may include the user's name, billing zip code and email. In some embodiments, the user contact information may have been stored in the swap service cache when previously entered and may be recalled by the swap service 105. When complete, the user taps the submit button at 229. At 230, the card information is sent to the swap service cache in the consumer device 104. At 231, the swap service 105 encrypts the card information and sends the receiving card information plus the net transfer amount (requested transfer amount less any service provider fees) to the remote system 102. The remote system 102 performs the necessary transactions with, for example, financial institutions and credit card issuers to authorize the transaction, establish any necessary escrow accounts, settle the transaction and transfer the value to the receiving account based on the user inputted information. At 232, the swap service 105 receives a message from the remote system 102 indicating a successful or unsuccessful transfer and may display a message indicating whether or not the transfer was successful. At 233, the swap service loads a success screen indicated that the transfer was completed successfully.

Figure 3A:
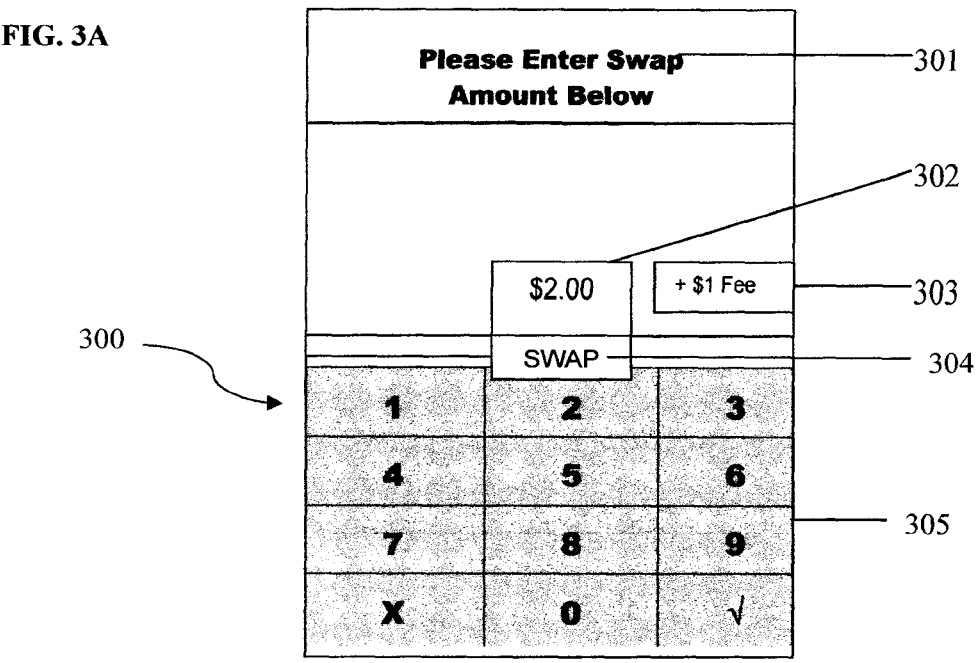

FIGS. 3A-3I illustrate exemplary screenshots of the swap service 105 according to one embodiment of the invention. FIG. 3A depicts an exemplary screen shot of the transfer request screen 300 of the swap service 105. In this embodiment, the swap service 105 presents a request for the user to input a transfer amount 301, a transaction amount indicator 302, a transfer request entry button 303, a submit button 304 (here, presented as a "SWAP" button") and a keyboard 305. All buttons described in this application may be presented as virtual buttons on a consumer device with a touch screen. In this embodiment, the transaction amount indicator 302 identifies the fees associated with the transaction. A user may enter the transfer amount in the transaction amount indicator 302 by using the keyboard 305.

Figure 3B:
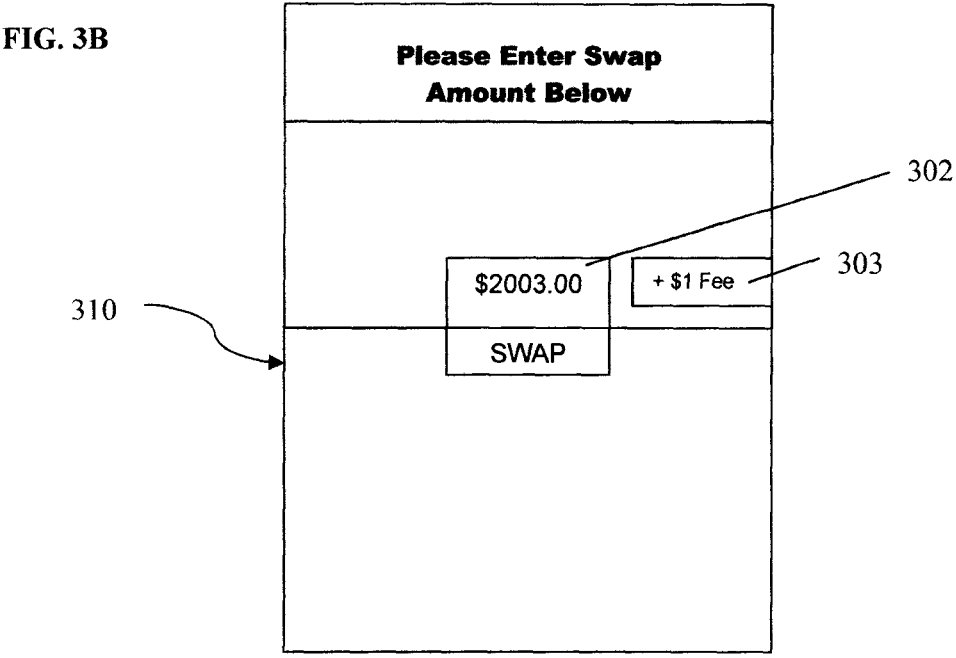

FIG. 3B illustrates an exemplary screen shot of an updated transfer request screen 310 following the user entry of the transfer amount according to one embodiment of the present invention. In FIG. 3B, the transaction amount indicator 302 has been updated to reflect the transfer request amount and the fees associated with the transfer. In this embodiment, the user may indicate acceptance of this amount by touching the transfer request entry button 303.

Figure 3C:
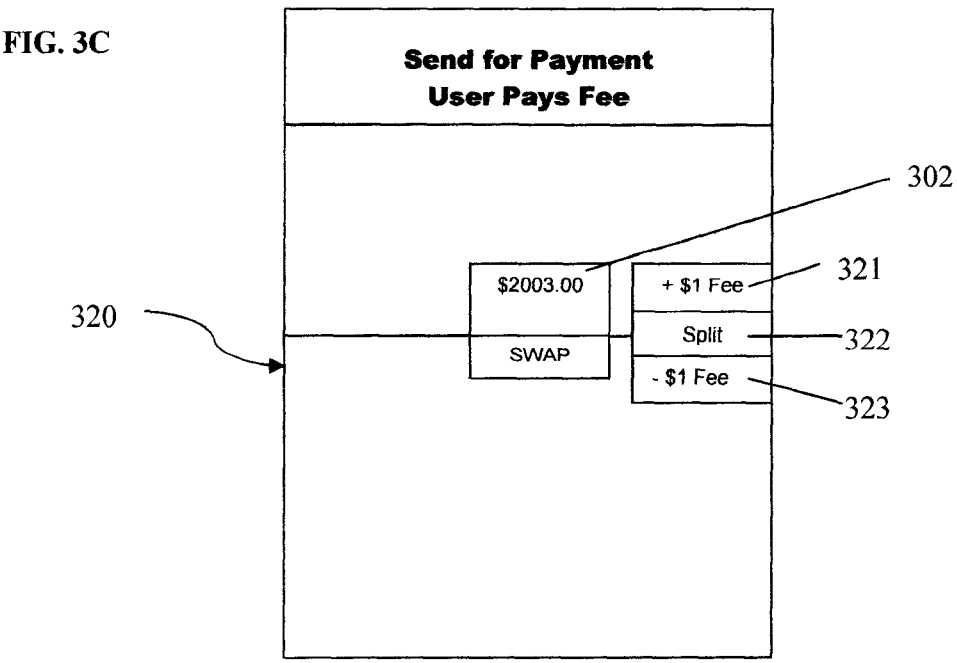

FIG. 3C illustrates an exemplary screen shot of a select fee payment screen 320 according to one embodiment of the present invention. The transfer request amount plus the fees is indicated in the transaction amount indicator 302. In some embodiments, where there is a disclosure of fees, the swap service may provide the disclosure of such fees followed by an option to choose which user (sender or receiver) is responsible for paying the fees. The swap service 105 presents a fee addition button 321, an input button 322 and a fee deduction button 323.

Figure 3D:
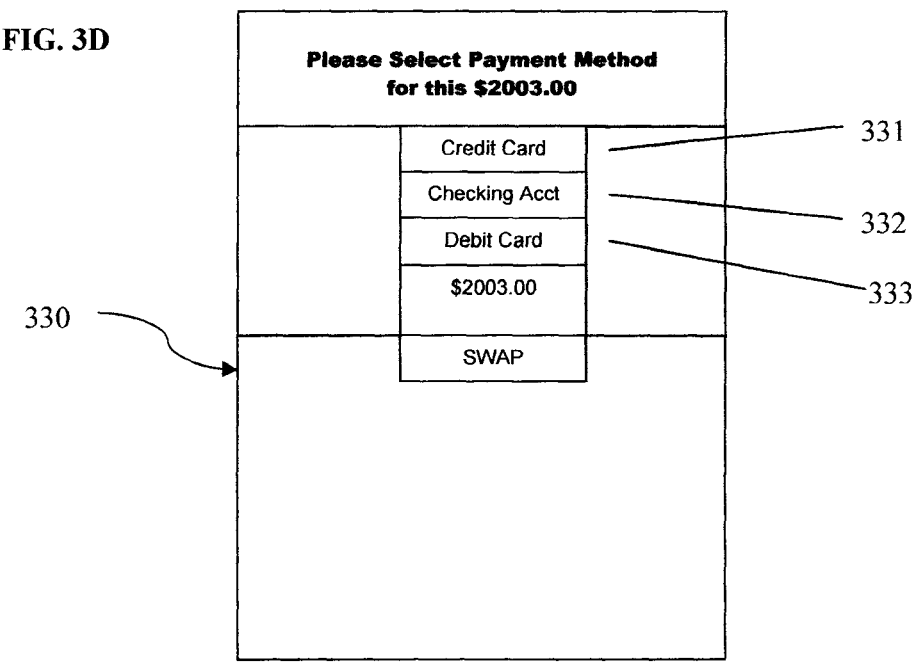

FIG. 3D illustrates an exemplary screen shot of a funding account type screen 330 according to one embodiment of the present invention. The swap service 105 presents options to the user regarding what account the user would like to use as the funding account. In this embodiment, the user may select funding the transfer with a credit card, a checking account, or a debit card by selecting the credit card button 331, checking account button 332, or debit card button 333 on the swap service 105.

Figure 3E:
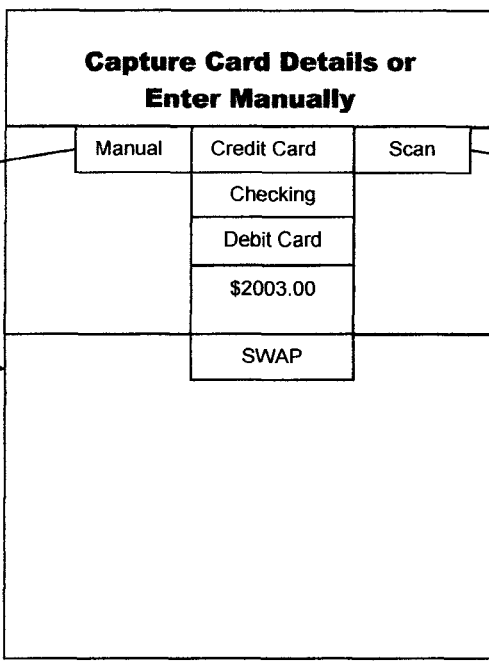

FIG. 3E illustrates an exemplary screen shot of a funding account information input screen 340 according to one embodiment of the present invention. Here, following the selection of the account that the user wishes to use to fund the transfer, the swap service 105 will request input of the funding card information. In this embodiment, the swap service 105 presents a manual input button 341 and a scanning input button 342. The user may select the input option and either manually input the funding card information or scan the funding card so that the swap service 105 may discern the card information.

Figure 3F:
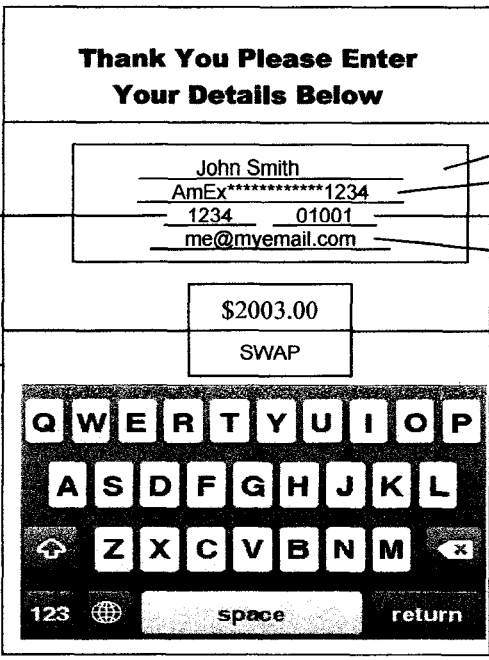

FIG. 3F illustrates an exemplary screen shot of a funding user contact information request screen 350 according to one embodiment of the present invention. In this embodiment, the swap service 105 displays input selections for the user's name 351, the funding card number 352, billing zip code 354, funding card identification (CID) 353 and email address 355. The swap service 105 may also present a keyboard 358 to allow the user to input the user's contact information. Such information may also be retrieved from storage based on the user's biometric information.

Figure 3G:
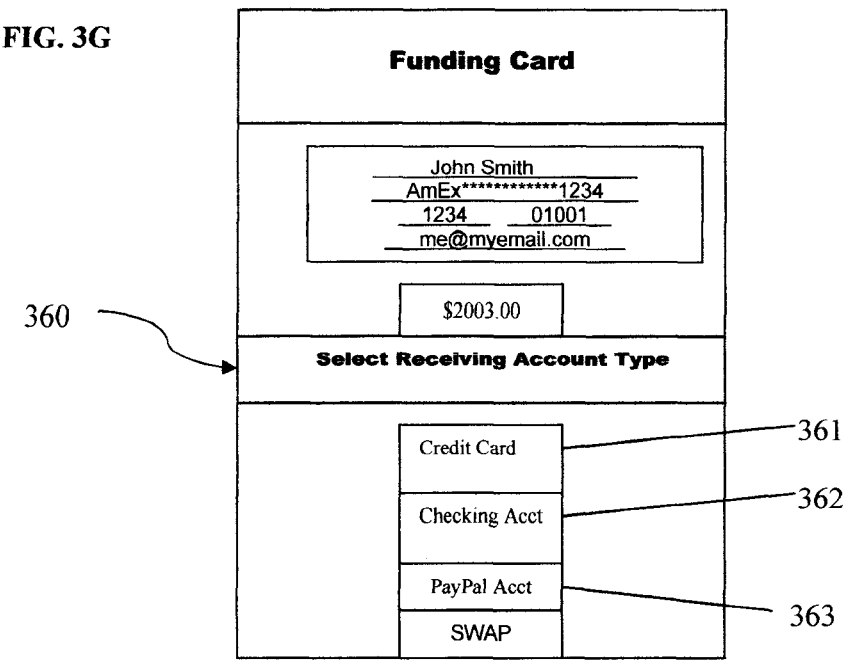

FIG. 3G illustrates an exemplary screen shot of a receiving account type screen 360 according to one embodiment of the present invention. The swap service 105 presents options to the user regarding what account the user would like to use as the receiving account. In this embodiment, the user may select transfer to a credit card, a checking account, or a PayPal account by selecting the credit card button 361, checking account button 362, or PayPal account button 363 on the swap service 105.

Figure 3H:
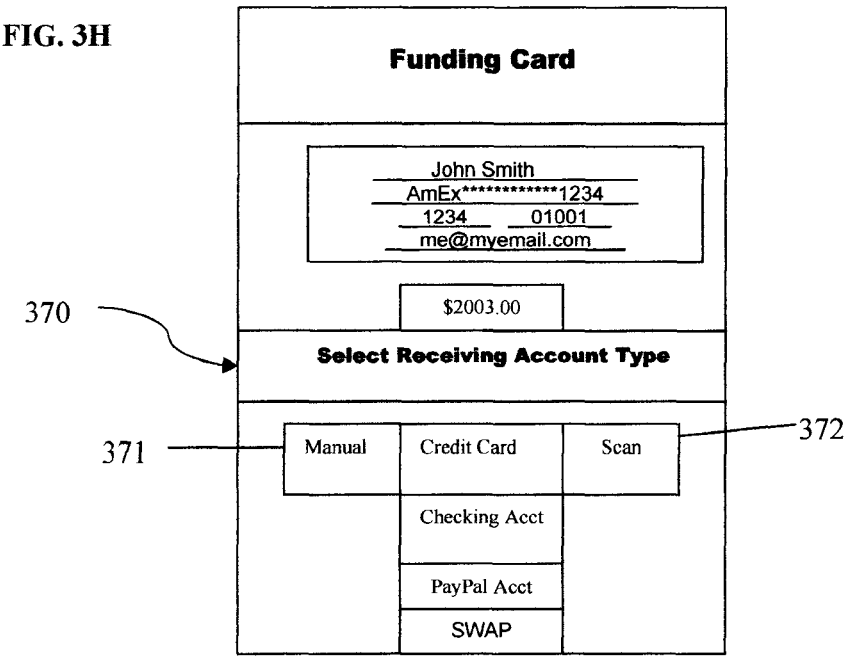

FIG. 3H illustrates an exemplary screen shot of the receiving account information input screen 370 according to one embodiment of the present invention. Here, following the selection of the account that the user wishes to use to receive the transfer, the swap service 105 will request input of the receiving card information. In this embodiment, the swap service 105 presents a manual input button 371 and a scanning input button 372. The user may select the input option and either manually input the funding card information or scan the funding card so that the swap service 105 may discern the card information.

FIG. 3I illustrates an exemplary screen shot of a receiving user contact information request screen 380 according to one embodiment of the present invention. The swap service 105 may request input selections for the user's name 381, the funding card number 382, funding card identification (CID) 383, billing zip code 384 and email address 385. In this embodiment, the swap service 105 queries the user as to whether the receiving user information is the same as the funding user information 386. If the user presses the "YES" button 387, the swap service 105 retrieves the previously entered and stored funding user account information and copies it into the receiving account user information. If the user presses the "NO" button, the user may be prompted to enter the new receiving user account information. The swap service 105 may also present a keyboard 358 to allow the user to input the user's contact information. The user may present the information to complete the transfer by pressing the "SWAP" button 389 which submits the transfer information.

Figure 4:
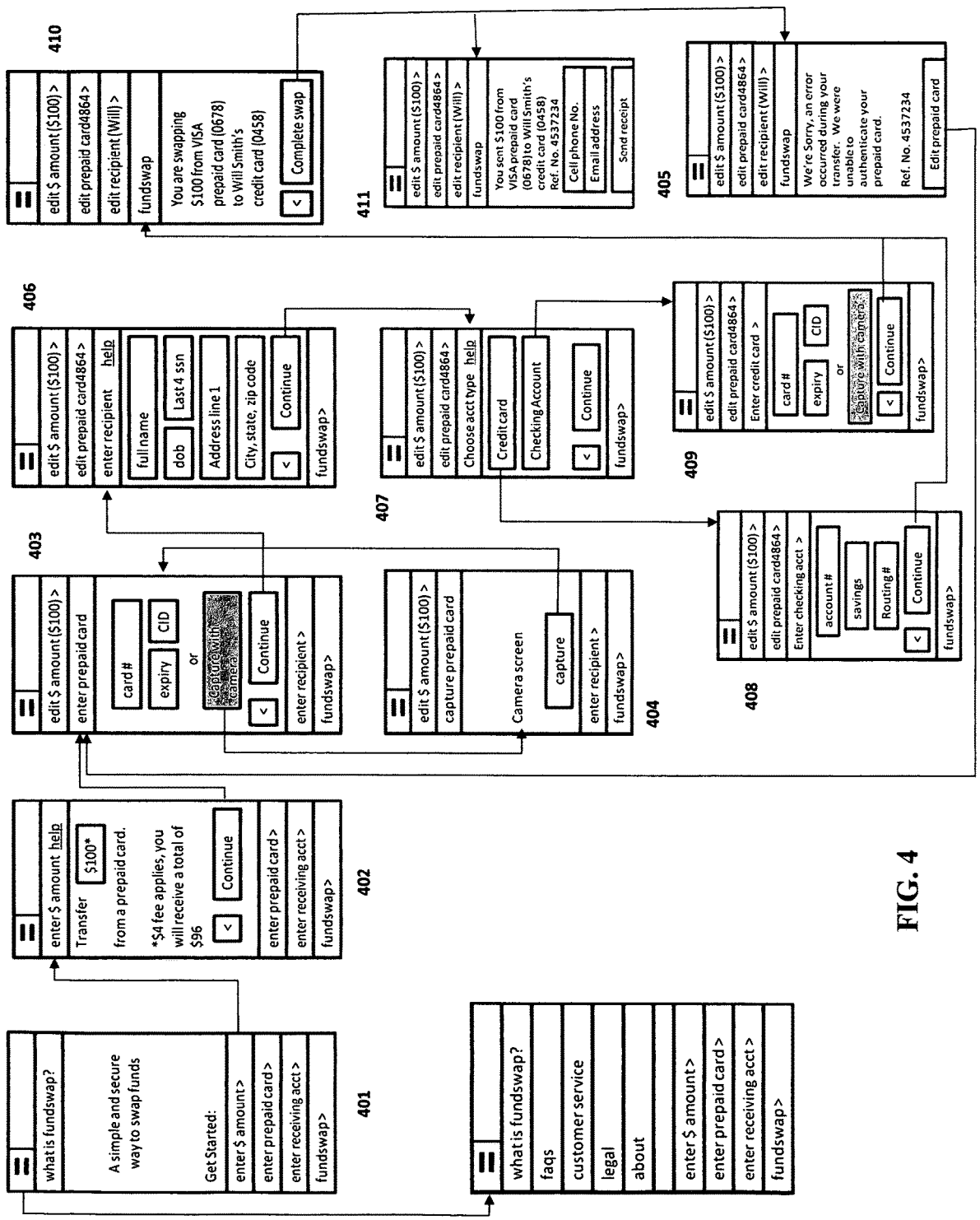
FIG. 4 shows a wireframe diagram depicting operation of the user side of the swap service in accordance with one embodiment of the invention.

FIG. 4 depicts a wireframe diagram 400 of operation of the service in accordance with one embodiment of the present invention. In this embodiment, the swap service presents an introductory screen 401 to the user with a button for entry of a transfer amount. The user may elect to transfer by pressing the transfer amount button which prompts the swap service to present a transfer amount screen 402 with a field for entering the transfer amount. In the depicted embodiment, the service also figures the service and/or user fees to be charged based on coding in the service and presents the user with notice of the fees to be charged and the net transfer amount. The user may elect to continue with the transfer by selecting the continue button. Upon the user's election to continue, the service presents a funding card information screen 403 that includes input fields for a funding card and the option to scan the funding card. If the user elects to scan the funding card information, a scanning screen 404 will be displayed. Scanning screen 404 includes a display area and a capture button. The user uses the camera on the consumer device and scans the card by depressing the capture button. The user is returned to screen 403 where the card information fields are now populated based on the scanned information. The user may accept the scanned information by depressing the continue button. Upon user acceptance, the service presents a recipient information screen 406 to the user. The recipient information screen 406 presents input fields to identify the funds recipient together with the continue button. Following entry of the recipient information, the user depresses the continue button and the swap service presents a funding card identification screen 407 to the user. Buttons on the funding card identification screen 407 provide options regarding identification of the receiving account type. In the depicted embodiment, credit card and checking account are presented but, as demonstrated elsewhere in this application, receiving accounts are not limited to prepaid cards and checking accounts. Upon the user's selection of a receiving account type, the swap service presents a card input screen 408 or an account input screen 409. The card input screen 408 presents input fields for manual entry of the card information or the option to scan the receiving card. If the user elects to scan the card, the swap service will present the scanning screen to the user, the user will scan the card and the swap service will extract the card information and populate the card information input fields. Once the card fields are populated, the user presses the continue button which brings the user to confirmation screen 410. Confirmation screen 410 presents a confirmation message and a complete swap button to the user. The user may accept the transfer by pressing the complete swap button. The service then carries out the swap in accordance with instructions coded in the swap service and the information provided by the user. If the swap is successful, the service presents success screen 411 to the user together with the option to enter an email address or phone number to which a receipt may be sent. If the swap fails, the service presents a failure screen 405 to the user. All buttons described in this application may be presented as virtual buttons on a consumer device with a touch screen.

Figure 5:
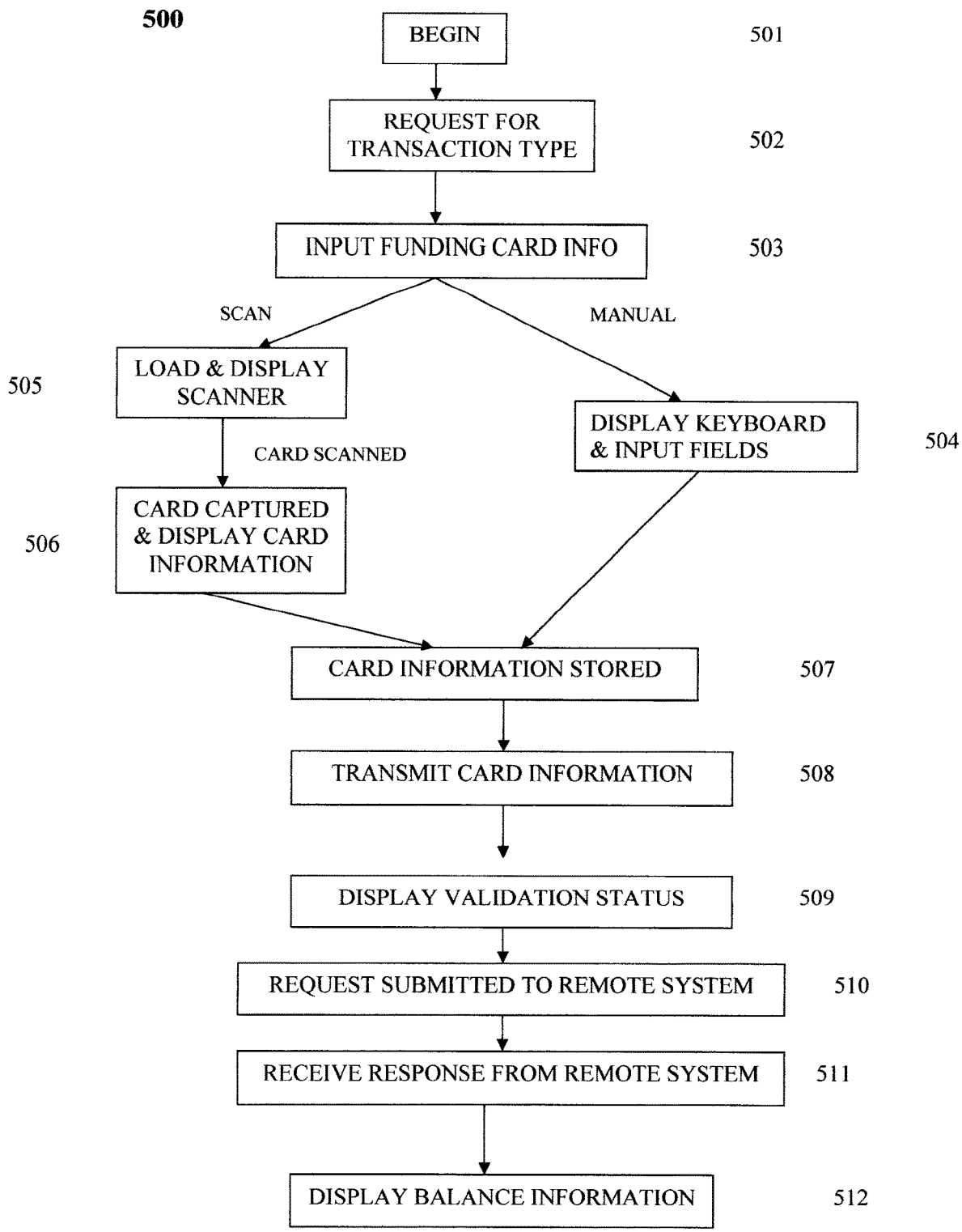
FIG. 5 is a flow diagram of a routine for retrieving the balances of the user's prepaid cards.

FIG. 5 is a flow diagram of a routine for retrieving the balances of the user's prepaid cards. FIG. 5 is a flow diagram of a routine 500 that operates the swap service 105 for retrieving the user's prepaid card balances. The method may begin at step 501 where the user starts program by accessing the swap service 105 from the consumer device 104. This may be accomplished by clicking on the program saved locally in the consumer device 104 or by accessing the swap service 105 through a web browser. At 502, the swap service 105 displays an option to check card balances. When the user elects to check card balances, the swap service 105 will request input of the card information at 503 with an option to enter the card information by scanning or manually. If manual input is selected, the swap service 105 may display a keyboard and input fields at 504. If scan input is selected, the scanner is displayed at 505. The scanner captures the card and displays the card information to the user at 506. The swap service 105 stores the card information at 507. At 508, the swap service transmits the card information to an aggregator service, which is a remote server as depicted in FIG. 1, for balance validation. In some instances, the card balance may not be successfully retrieved based on card information obtained by scanning. If the card balance not successfully retrieved, the swap service 105 will provide the user with the option to manually enter the card information at 504. Based on the provided information, the aggregator service identifies the financial institution associated with the card number based on issuer-specific criteria and the aggregator service contacts the prepaid Card issuer for validation of card information. The swap service 105 will display a success message or error message depending on whether the card information is valid or invalid at 509. If the card information is valid, the swap service 105 will request the balance information from the aggregator service at 510. At 511, the swap service receives balance information from the aggregator service and displays the information to the user at 512.

All publications and patents cited in this specification are herein incorporated by reference in their entirety. Although the invention has been described in connection with specific preferred embodiments and certain working examples, it should be understood that the invention as claimed should not be unduly limited to such specific embodiments. Various modifications and variations of the described methods and systems of the invention will be apparent to those skilled in the art without departing from the scope and spirit of the invention.

We claim:

1. A method comprising:

accessing a swap service, by a consumer device, to facilitate transferring value from a funding account to a receiving account, wherein the funding account is a gift card, wherein the consumer device is communicatively linked to a remote system, wherein the remote system includes a server computing device, a financial affiliate system and a transaction processor, wherein the remote system is communicatively linked to a transfer network, wherein the transfer network includes a funding account issuer system and a receiving account issuer system, and wherein the facilitating transferring value includes:

authenticating a user of the consumer device based on biometric information of the user, wherein the biometric information is linked to a unique user identification code, wherein the unique user identification code is associated with contact information regarding the user;

retrieving from storage, the contact information regarding the user;

automatically populating first fields of the swap service with the contact information;

obtaining, by the swap service on the consumer device for the facilitating transferring value, funding account information, receiving account information, fee information associated with the facilitating transferring value, and contact information for a second user associated with the receiving account, wherein the funding account information includes an identity of the gift card, and a transaction amount, and wherein the receiving account information includes an identity of a receiving account;

retrieving online, by the swap service on the consumer device, balance information of the gift card based on the funding account information, wherein the retrieving online includes the swap service crawling issuer web pages associated with the funding account information based on stored uniform resource locators;

automatically generating, by the swap service on the consumer device, the balance information within second fields of the swap service for display on the consumer device;

generating, by the swap service on the consumer device, virtual fee selection buttons based on the fee information, wherein the virtual fee selection buttons are displayed on a screen of the consumer device, wherein the virtual fee selection buttons include a fee addition button, a split fee button, and a fee deduction button, and wherein the split fee button allows the user to split a fee amount with the second user;

receiving, by the swap service on the consumer device, a selection by the user via the virtual fee selection buttons that indicates (a) whether the user or the second user is charged the fee amount, and (b) a proportion of the fee amount that each of the user and the second user is charged for the facilitating transferring value;

generating, by the swap service on the consumer device, a total transaction amount indicator field for display on the screen, wherein the total transaction amount indicator field includes a sum of the transaction amount and the fee amount;

generating, by the swap service on the consumer device, a complete transfer button for display on the screen;

receiving, by the swap service on the consumer device, an input from the user of a selection of the complete transfer button;

sending, by the swap service on the consumer device to the remote system, the funding account information and the receiving account information for authorization of the transferring value;

receiving, by the swap service on the consumer device from the remote system, a transfer status message that indicates whether the authorization of the transferring value was successful or unsuccessful; and generating, by the swap service on the consumer device, a status screen for displaying on a display of the consumer device, wherein the status screen includes a message based on the transfer status.

2. The method of claim 1, wherein the receiving account is one of a bank account, a credit card account, a debit card account, an open loop card account, a closed loop card account, a brokerage account, a PayPal account, a crypto currency account, and a stored value account.

3. The method of claim 1, wherein the receiving account information is obtained via a manual input, via voice commands, by extraction of information from a photo or video using optical character recognition or radio frequency identification (RFID).

4. The method of claim 1, wherein, an association of the transaction amount to the receiving account is completed through an automated clearing house (ACH), the funding account issuer's Billpay service, an intra-bank transfer, an automated teller machine (ATM) network, a crypto-currency service, a stored value network or a stored value service.

5. The method of claim 1, wherein the value transferred is in the form of loyalty points in a third party system that resulted from conversion by the remote system of the transaction amount into the loyalty points based on a conversion factor associated with a difference in the transaction amount and an assigned value of the loyalty points, and creating, by the remote system, the transaction amount to the third party system.

6. The method of claim 1, wherein the sending the funding account information and the receiving account information to the remote system is performed using a virtual wallet established by radio frequency identification (RFID), near field communication (NFC), Bluetooth low energy (BLE), wireless network, personal area network (PAN), or a computer network.

7. The method of claim 1 further comprising:
the swap service using the biometric information to identify the user is authorized to access the funding account.

8. A non-transitory computer readable medium comprising:
computer code that directs a consumer device to facilitate the transfer of value from a funding account to a receiving account, wherein the funding account is a gift card, the computer code directing the steps of:
accessing a swap service through the consumer device that is communicatively linked to a remote system, wherein the remote system includes a server computing device, a financial affiliate system and a transaction processor, wherein the remote system is communicatively linked to a transfer network, wherein the transfer network includes a funding account issuer system and a receiving account issuer system, and wherein the facilitating transferring value includes:
authenticating a user of the consumer device based on biometric information of the user, wherein the biometric information is linked to a unique user identification code, wherein the unique user identification code is associated with contact information regarding the user;
retrieving from storage, the contact information regarding the user;
automatically populating first fields of the swap service with the contact information;
obtaining, by the swap service on the consumer device for the facilitating transferring value, funding account information, receiving account information, fee information associated with the facilitating transferring value, and contact information for a second user associated with the receiving account, wherein the funding account information includes an identity of the gift card, and a transaction amount, and wherein the receiving account information includes an identity of a receiving account;
retrieving online, by the swap service on the consumer device, balance information of the gift card based on the funding account information, wherein the retrieving online includes the swap service crawling issuer web pages associated with the funding account information based on stored uniform resource locators;
automatically generating, by the swap service on the consumer device, the balance information within second fields of the swap service for display on the consumer device;
generating, by the swap service on the consumer device, virtual fee selection buttons based on the fee information, wherein the virtual fee selection buttons are displayed on a screen of the consumer device, wherein the virtual fee selection buttons include a fee addition button, a split fee button, and a fee deduction button, and wherein the split fee button allows the user to split a fee amount with the second user;
receiving, by the swap service on the consumer device, a selection by the user via the virtual fee selection buttons that indicates (a) whether the user or the second user is charged the fee amount, and (b) a proportion of the fee amount that each of the user and the second user is charged for the facilitating transferring value;
generating, by the swap service on the consumer device, a total transaction amount indicator field for display on the screen, wherein the total transaction amount indicator field includes a sum of the transaction amount and the fee amount;
generating, by the swap service on the consumer device, a complete transfer button for display on the screen;
receiving, by the swap service on the consumer device, an input from the user of a selection of the complete transfer button;
sending, by the swap service on the consumer device to the remote system, the funding account information and the receiving account information for authorization of the transferring value;
receiving, by the swap service on the consumer device from the remote system, a transfer status message that indicates whether the authorization of the transferring value was successful or unsuccessful; and
generating, by the swap service on the consumer device, a status screen for displaying on a display of the consumer device, wherein the status screen includes a message based on the transfer status.

9. The non-transitory computer readable medium of claim 8, wherein the receiving account is selected from the group consisting of a bank account, a credit card account, a debit card account, an open loop card account, a closed loop card account, a brokerage account, a PayPal account, a crypto currency account, and a stored value account.

10. The non-transitory computer readable medium of claim 8, wherein the obtaining the receiving account information is obtained via a manual input, via voice commands, by extraction of information from a photo or video using optical character recognition or radio frequency identification (RFID).

11. The non-transitory computer readable medium of claim 8, wherein an association of the transaction amount to the funding account is completed through an automated clearing house (ACH), the funding account issuer's Billpay service, intra-bank transfer, automated teller machine (ATM) network, crypto-currency service, or other stored value network or service.

12. The non-transitory computer readable medium of claim 8, wherein, an association of the transaction amount to the receiving account is completed through an automated clearing house (ACH), the funding account issuer's Billpay service, an intra-bank transfer, an automated teller machine (ATM) network, a crypto-currency service, a stored value network or a stored value service.

13. The non-transitory computer readable medium of claim 8, wherein the sending the funding account information and the receiving account information to the remote system is performed using a virtual wallet established by radio frequency identification (RFID), near field communication (NFC), Bluetooth low energy (BLE), wireless network, personal area network (PAN), or a computer network.

14. The non-transitory computer readable medium of claim 8 further comprising the swap service using the biometric information to identify the user is authorized to access the funding account.

* * * * *